(12) United States Patent
Pourzandi et al.

(10) Patent No.: US 8,452,957 B2
(45) Date of Patent: May 28, 2013

(54) METHOD AND NODES FOR PROVIDING SECURE ACCESS TO CLOUD COMPUTING FOR MOBILE USERS

(75) Inventors: Makan Pourzandi, Montreal (CA); Mats Naslund, Bromma (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 392 days.

(21) Appl. No.: 12/768,034

(22) Filed: Apr. 27, 2010

(65) Prior Publication Data

US 2011/0264906 A1    Oct. 27, 2011

(51) Int. Cl.
*G06F 21/00* (2006.01)

(52) U.S. Cl.
USPC ...... 713/153; 726/3; 726/7; 726/19; 380/277; 380/278; 713/189; 713/155; 709/217; 455/411; 705/71

(58) Field of Classification Search
USPC .......................................................... 713/153
See application file for complete search history.

(56) References Cited

U.S. PATENT DOCUMENTS

| | | | |
|---|---|---|---|
| 7,978,848 B2* | 7/2011 | Zhu et al. .................. 380/44 |
| 8,181,227 B2* | 5/2012 | Lau ............................ 726/3 |
| 2002/0178370 A1* | 11/2002 | Gurevich et al. .......... 713/189 |
| 2005/0081066 A1* | 4/2005 | Lahdensivu et al. ........ 713/202 |
| 2005/0262355 A1* | 11/2005 | Banet et al. ................ 713/180 |
| 2006/0232826 A1 | 10/2006 | Bar-El |
| 2006/0236405 A1* | 10/2006 | Terauchi et al. ............ 726/27 |
| 2007/0055873 A1* | 3/2007 | Leone et al. ............... 713/168 |
| 2008/0260155 A1* | 10/2008 | Kasahara et al. ........... 380/277 |
| 2009/0034733 A1* | 2/2009 | Raman et al. .............. 380/277 |
| 2009/0169017 A1* | 7/2009 | Smith et al. ............... 380/278 |
| 2009/0204806 A1 | 8/2009 | Kanemura et al. |
| 2010/0027552 A1 | 2/2010 | Hill |
| 2010/0263032 A1* | 10/2010 | Bhuyan et al. ............. 726/7 |

(Continued)

FOREIGN PATENT DOCUMENTS

| | | |
|---|---|---|
| EP | 2 043 396 A1 | 4/2009 |
| WO | 01/51342 A1 | 7/2001 |

(Continued)

OTHER PUBLICATIONS

Wu et al., "Secure and efficient key management in mobile ad hoc networks", Journal of Network and Computer Applications, Jul. 28, 2005.*

(Continued)

*Primary Examiner* — Morshed Mehedi
(74) *Attorney, Agent, or Firm* — Ericsson Inc.

(57) ABSTRACT

A mobile node, a gateway node and methods are provided for securely storing a content into a remote node. The mobile node, or a gateway node of a network providing access to the mobile node, applies a content key to the content prior to sending the content for storage in the remote node. The content key is generated at the mobile node, based on a random value obtained from an authentication server, or directly at the authentication server if applied by the gateway node. The content key is not preserved in the mobile node or in the gateway node, for security purposes. When the mobile node or the gateway node fetches again the content from the remote node, the same content key is generated again for decrypting the content. The remote node does not have access to the content key and can therefore no read or modify the content.

25 Claims, 8 Drawing Sheets

U.S. PATENT DOCUMENTS

| | | | |
|---|---|---|---|
| 2010/0332818 A1* | 12/2010 | Prahlad et al. | 713/150 |
| 2011/0107085 A1* | 5/2011 | Mizikovsky | 713/155 |
| 2011/0246765 A1* | 10/2011 | Schibuk | 713/158 |
| 2011/0252230 A1* | 10/2011 | Segre et al. | 713/155 |
| 2011/0264907 A1* | 10/2011 | Betz et al. | 713/153 |
| 2011/0299543 A1* | 12/2011 | Diab et al. | 370/401 |

FOREIGN PATENT DOCUMENTS

| | | |
|---|---|---|
| WO | 2005/064881 A1 | 7/2005 |
| WO | 2005/001148 A1 | 9/2005 |
| WO | 2008/077150 A2 | 6/2008 |
| WO | 2009/091459 A1 | 7/2009 |

OTHER PUBLICATIONS

International Search Report for PCT/IB2011/051852, mailing date of Nov. 29, 2011; 7 pages.

* cited by examiner

METHOD AND NODES FOR PROVIDING SECURE ACCESS TO CLOUD COMPUTING FOR MOBILE USERS

TECHNICAL FIELD

The present invention relates generally to the field of communications and, more specifically, to methods and nodes for providing secure access to cloud computing for mobile users.

BACKGROUND

Cloud computing is a technology that provides cost-efficient, on-demand computing and storage resources to end users. Key components of a cloud include virtualized software, infrastructure and computing platforms. Devices having limited capabilities, such as for example mobile phones, may benefit from using cloud computing to get access to external resources.

It is believed that cloud computing is not presently receiving a wide acceptance because of its lack of adequate security features. In fact, a user cannot currently be certain whether or not his data can be correctly safeguarded within the cloud.

Two common security or encryption themes exist, namely transport security and object security. While transport security protects data during transport between hosts, object security handles information as objects and also encrypts them as objects. Object security implies that information is encrypted also during storage. As a result, in principle, no additional protection is needed during transport of an object already protected as such. However, to process or consume data, for instance by rendering of an audio file, the object needs to be decrypted at some point, preferably in a secure environment.

Both of these security concepts suffer from important drawbacks. Transport security is provided by existing protocols that enable mutual authentication of nodes and then encryption of data packets exchanged therebetween. This concept can only apply between a data user and an entry point, or gateway, into a cloud. Transport security is not suitable when cloud computing is used and data is left unprotected within the cloud. On the hand, object security, which applies digital signatures and encryption to data objects, appears much more secure. However, operators of a network connecting end-users towards the entry point of the cloud may be subject to legal requirements such as legally authorized intercept, also called lawful intercept. Such requirements impose that network operators must be capable of providing law enforcement agencies with access to unencrypted content.

In line with the foregoing, it has been proposed to add a security gateway at an ingress point of a cloud computing network, the security gateway being part of a home network for a mobile user. The mobile user content can be encrypted at the gateway, before entering the cloud, by use of a session key. However, because such a session key can only be valid for the duration of a session, this solution requires that a session between the mobile user and the gateway be maintained for the lifetime of the user content. Moreover, this solution may be insufficient in a roaming scenario. When the mobile user is connected through a foreign network, or visited network, transport security may not be guaranteed between the visited network and the user's home network. The mobile user content may be readable and accessible while transiting through the visited network operator.

Additionally, existing solutions may apply a same key to all content accessing the cloud through the gateway, regardless of which end user that actually generates or receives the content. This cannot be acceptable in a cloud computing scenario in which content from different users should be treated independently.

SUMMARY

It is therefore a broad object of this invention to provide methods and nodes for allowing mobile users to securely access remote resources.

A first aspect of the present invention is directed a method of securely storing a content from a gateway node into a remote node. The method comprises a first step of receiving the content, at the gateway node, from a mobile node. The gateway node sends a request to generate a content key towards an authentication server. Responsively, the gateway node receives the content key from the authentication server. The gateway node then encrypts the content by use of the content key. It then transfers the encrypted content towards the remote node. Later, the gateway node fetches the content from the remote node. The gateway node sends towards the authentication server, a request to regenerate the same content key. Responsively, the gateway node receives the regenerated content key from the authentication server. The gateway node finally decrypts the fetched content by use of the regenerated content key.

A second aspect of the present invention is directed to a method of securely storing a content from a mobile node into a remote node. The method is initiated by a step of sending a request for a first challenge from the mobile node towards an authentication server. The mobile node receives the first challenge from the authentication server, the first challenge comprising a random value. The mobile node generates a content key based on the random value and then encrypts the content by use of the content key. The encrypted content is transferred from the mobile node towards the remote node, after which the content key is discarded from the mobile node. The mobile node fetches the content from the remote node and sends towards the authentication server, a request to generate a second challenge. Responsively, the mobile node receives the second challenge from the authentication server. The mobile node regenerates the same content key based on the random value and decrypts the fetched content by use of the regenerated content key.

A third aspect of the present invention is directed to a gateway node for securely storing a content into a remote node. The gateway node comprises an interface configured to communicate with a mobile node, with an authentication server and with the remote node. The gateway node also comprises a controller. The controller controls the interface. The control also receives the content from a mobile node. The controller sends towards the authentication server a request to generate a content key. Having received the content key from the authentication server, the controller encrypts the content by use of the content key and transfers the encrypted content towards the remote node. Later, the controller fetches the content from the remote node. It sends towards the authentication server, a request to regenerate the same content key. Having received the regenerated content key from the authentication server, the controller decrypts the fetched, content by use of the regenerated content key.

A fourth aspect of the present invention is directed to a mobile node for securely storing a content into a remote node. The mobile node comprises an interface configured to communicate with an authentication server and with the remote node. The mobile node also comprises a controller. The controller controls the interface. The controller also sends towards the authentication server a request for a first challenge. Having received the first challenge from the authentication server, the first challenge comprising a random value, the controller generates a content key based on the random value and encrypts the content by use of the content key. The controller transfers the encrypted content towards the remote node and then discards the content key. Thereafter, the controller fetches the content from the remote node. It also sends towards the authentication server a request to generate a second challenge. Having received the second challenge from the authentication server, the controller regenerates the same content key based on the random value and decrypts the fetched content by use of the regenerated content key.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION

The innovative teachings of the present invention will be described with particular reference to various exemplary uses and aspects of the preferred embodiment. However, it should be understood that this embodiment provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the description of the figures, like numerals represent like elements of the invention.

The present invention provides methods and nodes for securing user resources that a mobile node user may store for future access in a "cloud". The cloud generally refers to a cloud computing network, that is, a collection of Internet-accessible resources. It is desired to ensure that a mobile user can store for later retrieval information in the cloud while preventing third parties or even a cloud node storing the information from reading, modifying or otherwise altering the information. In general, a high level of trust exists between the mobile user and his/her mobile device and between the mobile user/device and his/her mobile network (cellular) operator. This high level of trust is supported by the use of keys used for authentication and encryption, such as a long term shared secret key, stored both in the mobile device and in an authentication server of the mobile network operator. Contrastingly, little or no level of trust may exist between the mobile user and a cloud computing service provider (CCSP). This lack of trust may be due to the fact that data may travel through numerous routers, gateways and other nodes prior to reaching its destination within the cloud, or to the fact that the mobile user simply has no reliable information about the true legitimacy of the actual cloud node that stores the information.

The present invention ensures that information or data that the mobile user stores in a cloud resource is encrypted before leaving a trusted part of the network—generally the cellular network part—and remains encrypted while present in the cloud network. Optionally or alternatively, integrity of the information or data may also be protected by aspects of the present invention. Since these integrity aspects of the present invention are similar to the content encryption aspects, they will be readily understood by those of skill in the art. As such, integrity aspects are only briefly presented in the following description of embodiments of the present invention.

In many jurisdictions, a legal requirement is imposed on mobile cellular operators in which they are compelled to provide lawfully authorized electronic surveillance (LAES) capabilities to legal authorities. When requested, for example under a Court order, the operators need to be able to decrypt user information. The present invention provides this capability because the mobile network operators have access to keys used for encrypting users' information.

Of course, user data or information having been encrypted prior to uploading in the cloud, using a given encryption key, will need to be decrypted by use of the same encryption key when it is downloading again from the cloud. It is not advisable to maintain that encryption key in the user device when not actually needed because the user device might be lost or stolen, which could provide a malicious party with access of the user information.

In the context of the present invention, a mobile node (MN) may comprise a mobile cellular telephone, a user equipment (UE) as defined in $3^{rd}$ generation partnership project (3 GPP) specifications or in $3^{rd}$ generation partnership project 2 (3 GPP2) specifications, a digital personal assistant, a laptop computer, a gaming device, a server, and the like. In 3 GPP embodiments of the present invention, the MN may comprise a smart card holding a subscriber identity module (SIM) responsible for security functions such as authentication and key management. The SIM may comprise a Universal Mobile Telecommunication System (UMTS) SIM (USIM). However, those of skill in the art will appreciate that other, non-3 GPP security mechanisms may be used in the context of the present invention.

Upcoming multi-access terminals may support a plurality of simultaneous connections to several clouds. As an example, a given MN may have a plurality of virtual machines (VM) and be at once connected to a corporate cloud network, on one connection of one VM, and to a commercial cloud network, on another connection of another VM. Additionally, the MN may be able to concurrently use different access technologies, for example having access to a corporate cloud using a 3 GPP or 3 GPP2 cellular technology concurrently with access to a public cloud using a WLAN. The present invention supports a separation of the connections by preventing leakage of information, within the MN, between the corporate cloud and the commercial cloud.

Regardless, the MN is connected towards a remote node in which it is desired to store user information for later retrieval. The user information, also referred to as "content" throughout the present disclosure, may refer to any type of information that has some value to the user of the MN. As examples, the content may comprise an audio file, a video file, a digitized photograph, a personal address book, an executable program, a source code, a text file, a spreadsheet, banking information, and the like. The remote node may take the form of a storage node, server or database, and may be part of numerous types of networks. The remote node may thus be part of a cloud network. The MN is provided with access by use of an access network, generally a mobile network, also called mobile cellular network or simply cellular network. The mobile network may comply with various standard air interface protocols. Generally, the MN may have a subscription within the mobile network, or within a part of the mobile network, and a high level of trust exists between the MN and the mobile network, at least at in the part of the mobile network where the MN is subscribed.

Figure 1:
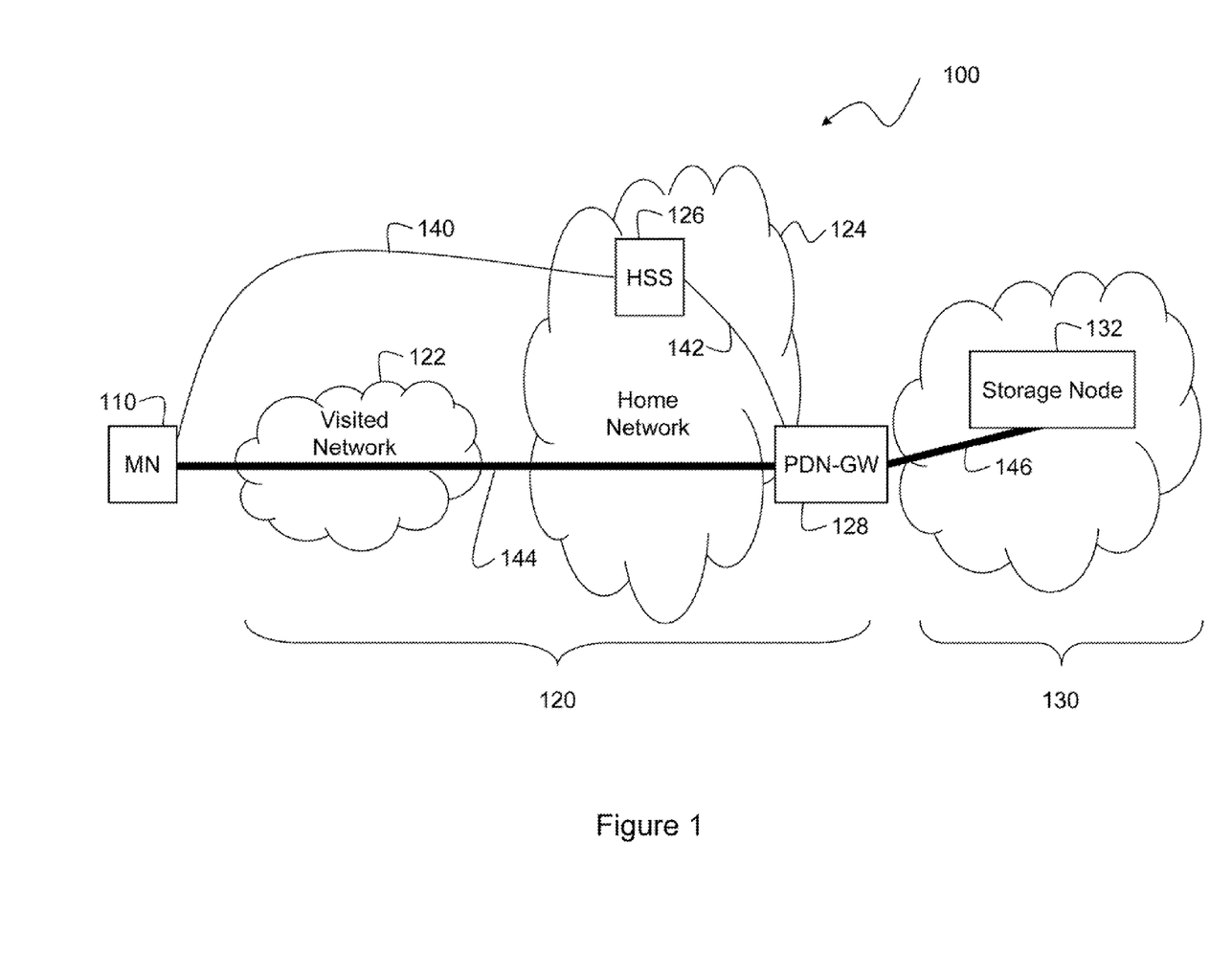
FIG. 1 shows a mobile network providing access to a cloud network for a mobile node.

Reference is now made to the Drawings, in which FIG. 1 shows a mobile network providing access to a cloud network for a mobile node. A network 100 comprises a mobile network 120 and a cloud computing network 130. The cloud computing network 130 comprises a storage node 132. The mobile network 120 comprises a home network 124 and may further comprise a visited network 122. The home network 124 is where a MN 110 has its subscription. The visited network 122 represents a part of the mobile network 120 where the MN 110 is currently receiving access, the visited network 122 not having a subscription of the MN 110. The home network 124 further comprises an authentication server, for example a home subscription server (HSS) 126, and a packet data gateway (PDN-GW) 128. The PDN-GW 128 connects the mobile network 120 into the cloud computing network 130 and, consequently, is sometimes also called cloud gateway (CGW). A high level of trust exists between the various elements of the home network 124. For example, signaling between the HSS 126, the PDN-GW 128 can be considered secure. Trust can also be established between the MN 110 and the home network 124 because the HSS 126 and the MN 110 both store a long term shared key (ShK) of the MN 110. Signaling between the MN 110 and the HSS 126 can be protected by use of the ShK when using native 3 GPP security protocols. When using other security protocols, use of additional session keys or transport keys derived from the ShK may also be in place.

Also shown of FIG. 1 are various signaling paths and data path. A first signaling path 140 is used for communication between the MN 110 and the HSS 126. A second signaling path 142 is used for communication between the HSS 126 and the PDN-GW 128. A first data path 144 allows exchange of traffic information, such as packets, useful content and information, between the MN 110 and the PDN-GW 128. A second data path 146 has similar functionality between the PDN-GW 128 and the storage node 132.

The exemplary network 100 is much simplified for ease of illustration. For example, the mobile network may comprise a radio access network such as a cellular access network, $3^{rd}$ or $4^{th}$ generation (3 G, 4 G) cellular networks, wireless local area network (WLAN) and the like. Radio base stations or radio access points are not shown for simplicity. Of course, the mobile network 120 may comprise other elements (not shown), as is well known in the art, and generally provides access to a very large number of mobile nodes. Likewise, the cloud computing network 130 may comprise a multitude of storage nodes, routers, servers, gateways, databases, and the like. In many cases, the mobile network 120 may connect towards one or more cloud networks, each of these connections being through one of more gateways.

Additionally, even though elements of the network 100 are shown as directly coupled in FIG. 1, the elements may be indirectly coupled and separated geographically. The simplified coupling is shown in order to more clearly illustrate the various communication paths. The elements introduced in the description of FIG. 1 are reused in the following description of the various embodiments of the present invention.

Figure 2:
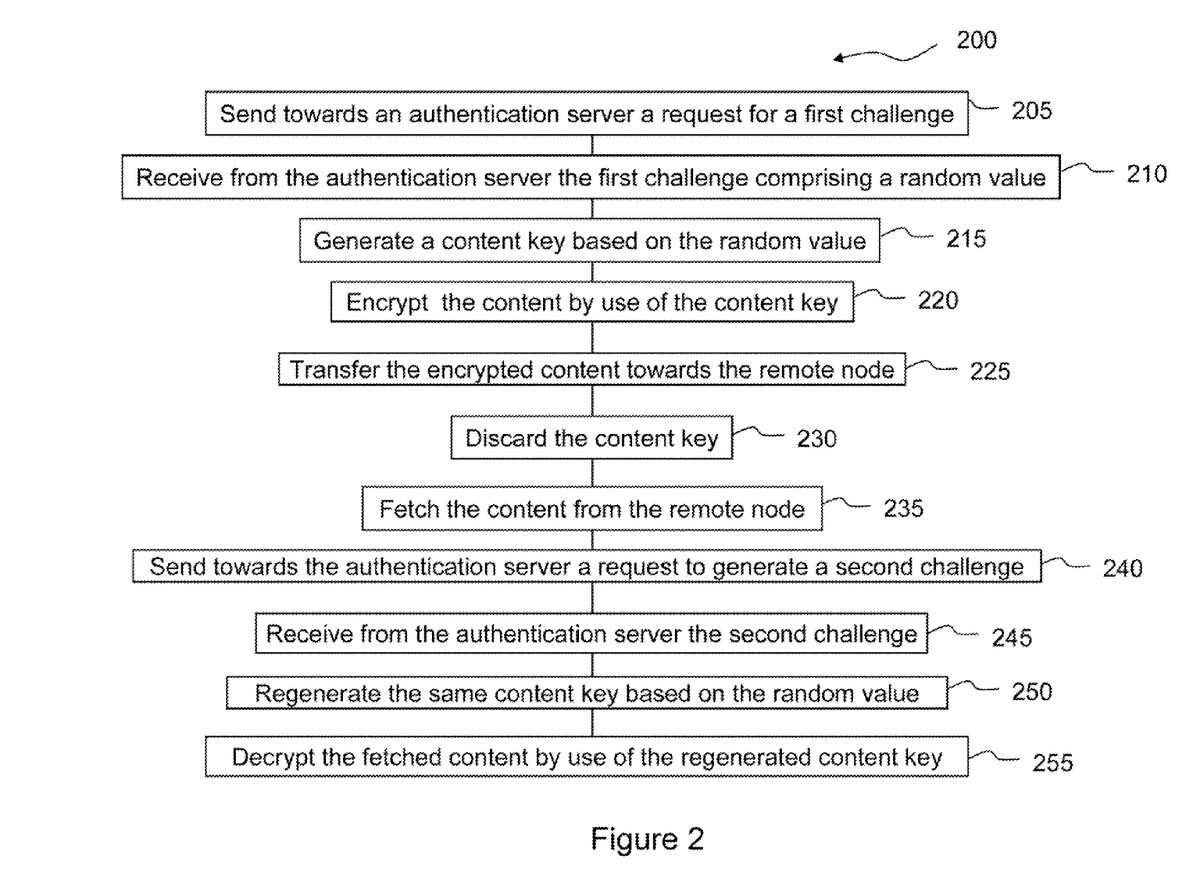
FIG. 2 shows exemplary steps of a method implemented in a mobile node for securely storing and retrieving a content in a remote node, as per some teachings of the present invention.

FIG. 2 shows exemplary steps of a method implemented in a mobile node for securely storing and retrieving a content in a remote node, as per some teachings of the present invention. A sequence 200 starts at step 205 when the MN, which has a content for storing in a remote node, sends towards an authentication server a request for a first challenge. The first challenge is received at the MN at step 210, comprising a random value. At step 215, the MN uses the random value to generate a content key (CK). The CK is then used at step 220 to encrypt the content. The encrypted content is then transferred to the remote node at step 225. The CK is discarded from the MN at step 230. At some later point in time, the MN fetches again the content from the remote node at step 235. Because the content has been stored in encrypted form, the MN sends towards the authentication server a request to generate a second challenge at step 240. Receiving the second challenge at step 245, the MN regenerates the same CK based on the random value at step 250. The MN then uses the CK to decrypt the fetched content at step 255.

In the event that the MN is lost or stolen, the user informs his service provider who in turn blocks the user's subscription in the authentication server. Because the CK is not maintained in the MN while the content is stored in the remote node, another person having obtained access to the lost or stolen MN cannot easily fetch and decrypt the content.

Figure 3:
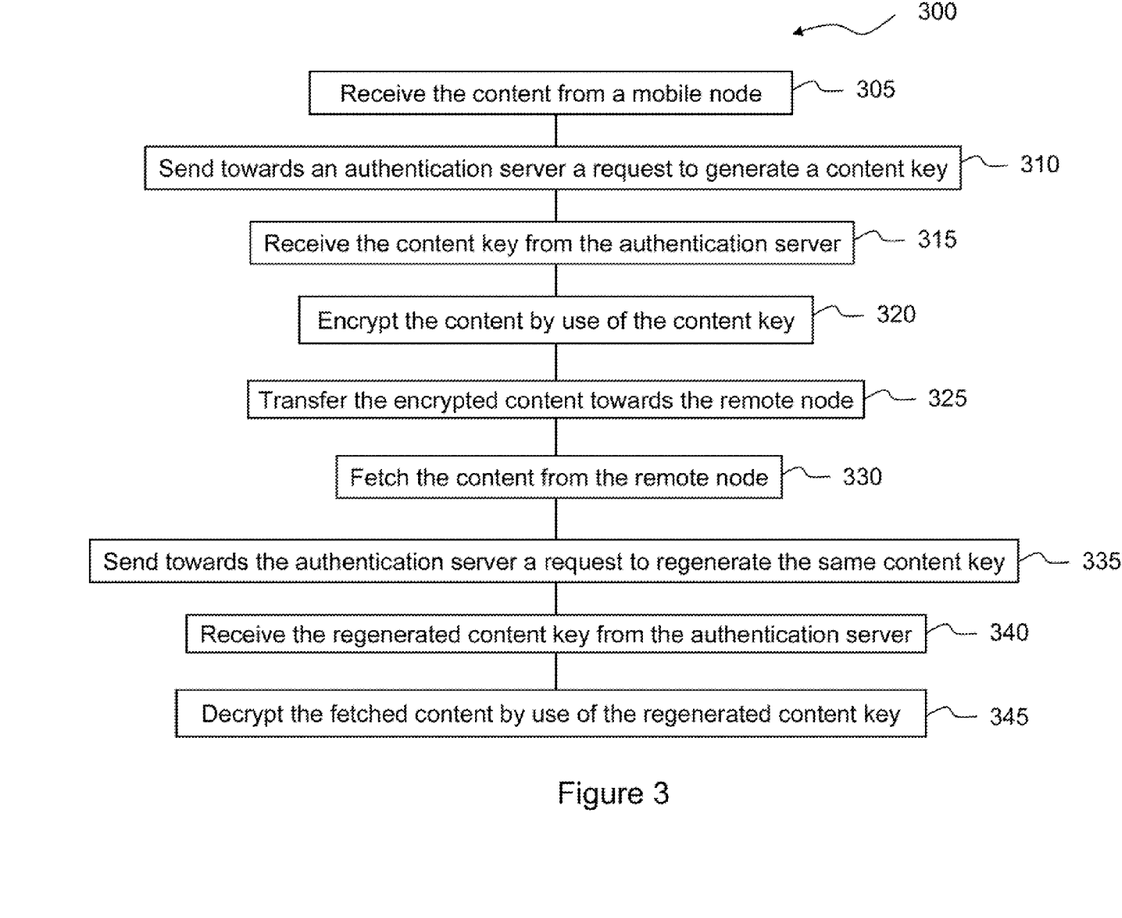
FIG. 3 shows exemplary steps of a method implemented in a gateway node for securely storing and retrieving a mobile node content into a remote node, as per some teachings of the present invention.

FIG. 3 shows exemplary steps of a method implemented in a gateway node for securely storing and retrieving a mobile node content into a remote node, as per some teachings of the present invention. A sequence 300 starts at step 305 when the gateway node receives the content from the mobile node. The gateway node sends towards an authentication server a request to generate a CK, step 310. The CK is received at the gateway node form the authentication server at step 315. The gateway node encrypts the content by use of the CK at step 320, and then transfers the encrypted content towards the remote node at step 325. Later, generally upon request from the MN, the gateway node fetches the content from the remote node, step 330. The gateway node sends towards the authentication server a request to regenerate the same CK at step 335. The regenerated CK is received at the gateway node at step 340. The gateway node can then decrypt the content by use of the CK at step 345.

Figure 4A:
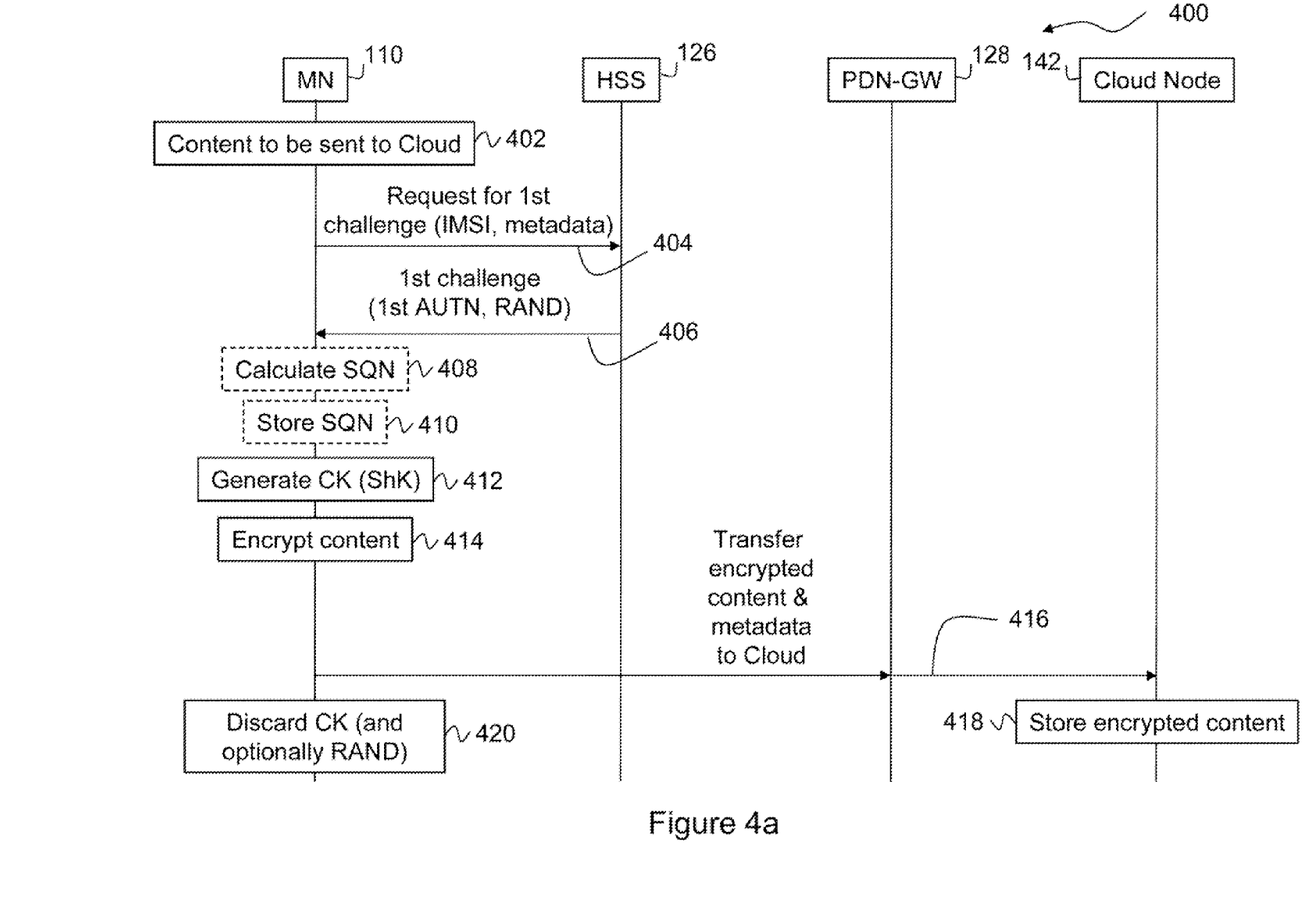
FIGS. 4a and 4b show an exemplary sequence diagram of an embodiment of a method of the present invention, centered at a mobile node.
Figure 4B:
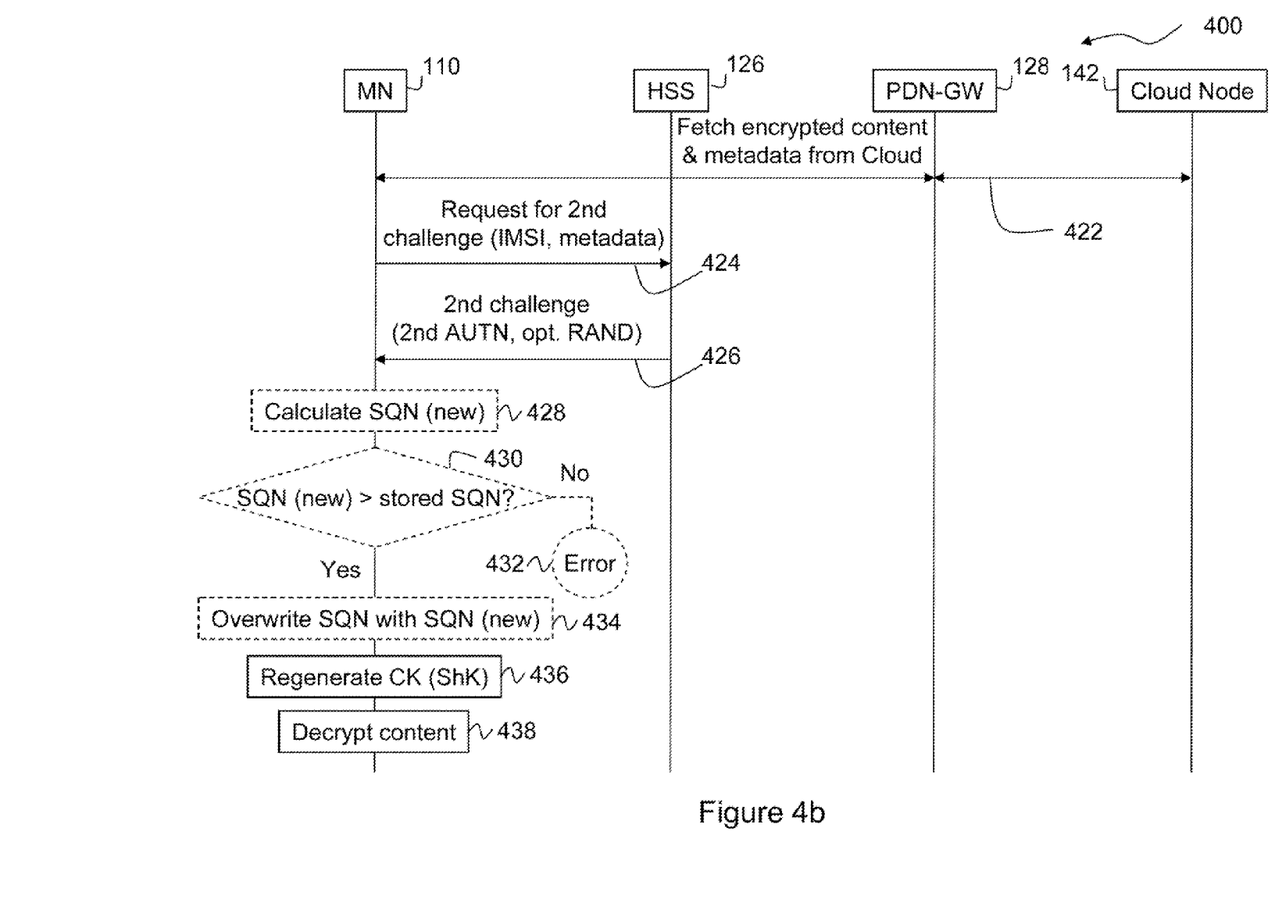

FIGS. 4a and 4b, collectively referred to as FIG. 4, show an exemplary sequence diagram of an embodiment of a method of the present invention, centered at a mobile node. A sequence 400 takes places between the various elements previously introduced in the description of FIG. 1. The sequence starts at step 402 when the MN 110 has a content that it intends to store remotely, in a node of the cloud. The MN 110 sends a request for first challenge at step 404, the request comprising an identity of the MN 110, for example an international mobile station identity (IMSI). In some embodiments, the MN 110 may be capable of having more than one CK for storing the same or distinct contents in distinct cloud networks. In order to identify each distinct CK, the MN 100 may generate a pointer, or "metadata", which is added to the request of step 404. The request is sent to an authentication server, which in the present exemplary embodiment is the HSS 126. The HSS 126 may store the metadata for later retrieval. The HSS 126 responds at step 406 with a first challenge. The first challenge comprises a random value (RAND). In cases where the MN 110 complies with recent 3

GPP specifications, the USIM handles security features of the MN 110. In those cases, the first challenge may further comprise a first authentication token (AUTN). If the first AUTN is comprised, the MN 110 may calculate a sequence number (SQN) at step 408. The SQN is based on the first AUTN. In some embodiments, the SQN is calculated according to equation (1):

$$SQN=F_s(ShK,RAND,AUTN) \quad (1)$$

Wherein:
ShK is a shared secret key of the MN 110, known by the MN 110 and the HSS 126;
AUTN is the first authentication token received with the first challenge;
RAND is the random value: and
$F_s$ denote any one of many suitable cryptographic functions.

A block cipher and a one-way hashing function are examples of suitable functions $F_s$. The SQN format can vary in distinct embodiments. The MN 110 and the HSS 126 need to both compute the SQN in the same manner. In some embodiments, the SQN may be an unsigned 32-bit value.

Next, the MN may verify the AUTN. Verification of the AUTN may be made according to the method described in the 3rd Generation Partnership Project (3 GPP) Technical Specification (TS) 33.102 V9.1.0 (2009-12), Technical Specification Group Services and System Aspects; 3 G Security; Security architecture (Release 9). AUTN verification is well-known in the art and is therefore not described herein.

The MN 110 may store the SQN in a local memory at step 410, in some cases following an optional check of the AUTN. The MN 110 then generates a CK at step 412. In some embodiments, the CK is calculated according to equation (2):

$$CK=F_c(ShK,RAND) \quad (2)$$

Wherein:
ShK is the same shared secret key of the MN 110;
RAND is the random value received with the first challenge and
$F_c$ denotes any one of many suitable cryptographic functions.

A block cipher and a one-way hashing function are examples of suitable functions $F_c$. The CK format can vary in distinct embodiments. In some embodiments, the CK is an unsigned 128-bit value. In some embodiments, the $F_c$ is the well-known F3 function as described in the TS 33.102 V9.1.0 (2009-12) specification.

As introduced hereinabove, the present invention may be used to provide verification of the integrity of user content. An integrity protection key (IK) may be calculated for this purpose. The manner of calculating the IK is similar to that of calculating the CK, replacing the function $F_c$ by some other suitable function $F_1$ in equation (2). In the context of the present invention, the IK is used in a similar manner as the CK, though for the purpose of integrity protection rather than for content encryption. The present invention supports using either or both the CK and the IK in order to ensure either or both of content encryption and content integrity. In some embodiments, the IK may be used without actually using the CK. This may be the case when content encryption is not required by an application while content integrity is required.

The MN 110 encrypts the content by use of the CK at step 414. This may for example be accomplished by applying an encryption function based on the CK, in cipher-block chaining or counter mode. However, those skilled in the art will recognize that there exist other well-known methods of encrypting a content by use of an encryption key. Though not repeated all places in the present description, every step comprising encrypting the content by use of the CK may alternatively or additionally comprise protecting the integrity of the content by use of the IK.

The MN 110 then transfers the encrypted content, optionally comprising the metadata, to the cloud computing network 130 at step 416. Specifically, the content is sent to a given cloud node 142 (or storage node 132) within the cloud 130, by addressing that cloud node 142 by use of an IP address thereof. The content may transit through the PDN-GW 128 because it acts as a cloud gateway for the mobile network 120, but the content essentially passes through the PDN-GW 128 in a transparent fashion. The cloud node 142 receives and stores the encrypted content at step 418. It is to be noted that the cloud node 142 does not possess the CK and can therefore not read or modify the content.

At step 420, the MN 110 discards the CK and may optionally discard the RAND. This enhances the security of the content because if the MN 110 is ever lost or stolen, inasmuch as its user informs the HSS 126 operator that the security of the subscription is compromised, the HSS 126 will later refuse to provide any new challenge to the MN 110.

At any point of time thereafter, the MN 110 may fetch the content and the optional metadata from the cloud node 142, at step 422. The step 422 is shown with bidirectional arrows, indicating that it may comprise one or more messages consisting of a request and response exchanged between the MN 110 and the cloud node 142. The step of fetching implies signaling and data passing transparently through the PDN-GW 128. Having acquired the encrypted content, the MN 110 sends at step 424 a request for a second challenge to the HSS 126. The request typically comprises the IMSI identifying the specific MN 110 and may also include the metadata for indicating to the HSS which CK needs to be regenerated. The MN 110 receives the second challenge at step 426, optionally comprising the same RAND as that of step 406, this being particularly useful if the MN 110 has discarded the RAND at step 420, and optionally comprising a second AUTN. The second AUTN, if included, differs from the first AUTN. If the second AUTN is included, the MN 110 may calculate a new SQN at step 428. The new SQN is calculated in the same manner as the earlier stored SQN, using equation (1). The HSS 126 has provided the second AUTN calculated such that the new SQN should be greater than the stored SQN. This is verified by the MN 110 at step 430. If the new SQN is not greater than the stored SQN at step 430, the MN 110 determines that the second challenge may have been received from a malicious node.

As is known to those skilled in the art of 3 GPP-based mobile networks, the USIM of the MN 110 may be used for a plurality of purposes. Besides providing keys for secure storage in a cloud as presently discussed, the USIM may also provide other keys used for basic network access services, comprising for example encryption of the radio interface between the MN and the access network. Consequently invocations of the USIM for key generation may alternate between events related to access network uses and uses for storage of contents in the cloud network. Each of these uses of the USIM may, in some embodiments, cause the SQN to be stepped. Consequently, the test of step 430 may involve the new SQN being greater than the stored SQN by more than one.

The MN 110 may determine at step 432 that the second challenge is in error and, in which case it ends the process. Normally, following a positive result of the test of step 430, or following receipt of the second challenge at step 426, if no SQN verification takes place, the process continues at step

434 where the MN 110 overwrites the stored SQN with the newly calculated SQN. The MN 110 then regenerates the CK at step 426, on the basis of the RAND and of the ShK, using equation (2). The MN 110 may then proceed to decrypt the content at step 438.

Those skilled in the art will appreciate that the content has been exchanged between the MN 110 and the cloud node 142, through the PDN-GW 128, encrypted by use of the CK calculated on the basis of the ShK of the MN 110, known by the HSS 126, and on the basis of the RAND, which is also provided by the HSS 126. In the event where the operator of the home network 124 is compelled by a Court order to provide electronic surveillance of various communications of the MN 110, a monitoring element of the home network 124 remains capable of obtaining and decrypting the content. Alternatively, a law enforcement authority may be provided with the encrypted content and with the CK.

Figure 5A:
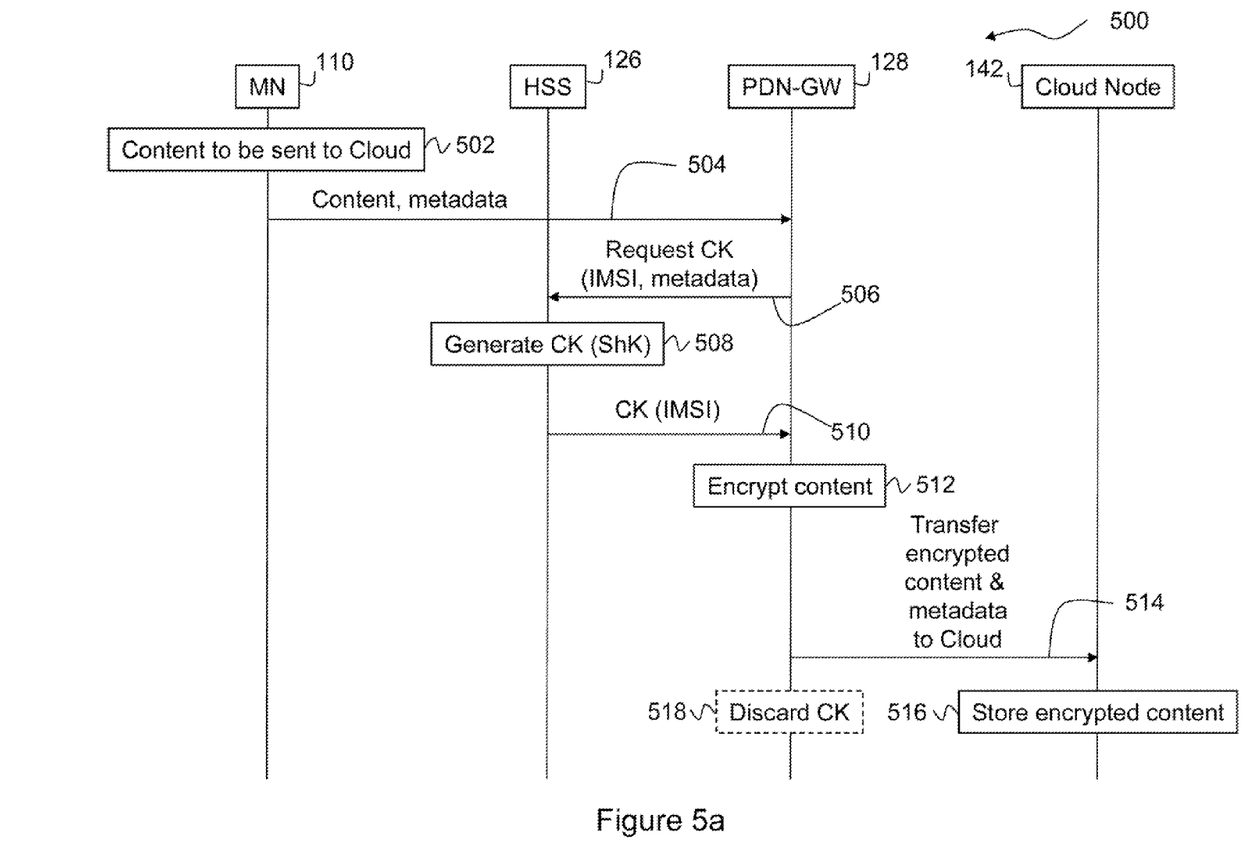
FIGS. 5a and 5b show an exemplary sequence diagram of another embodiment of a method of the present invention, centered at a gateway node.
Figure 5B:
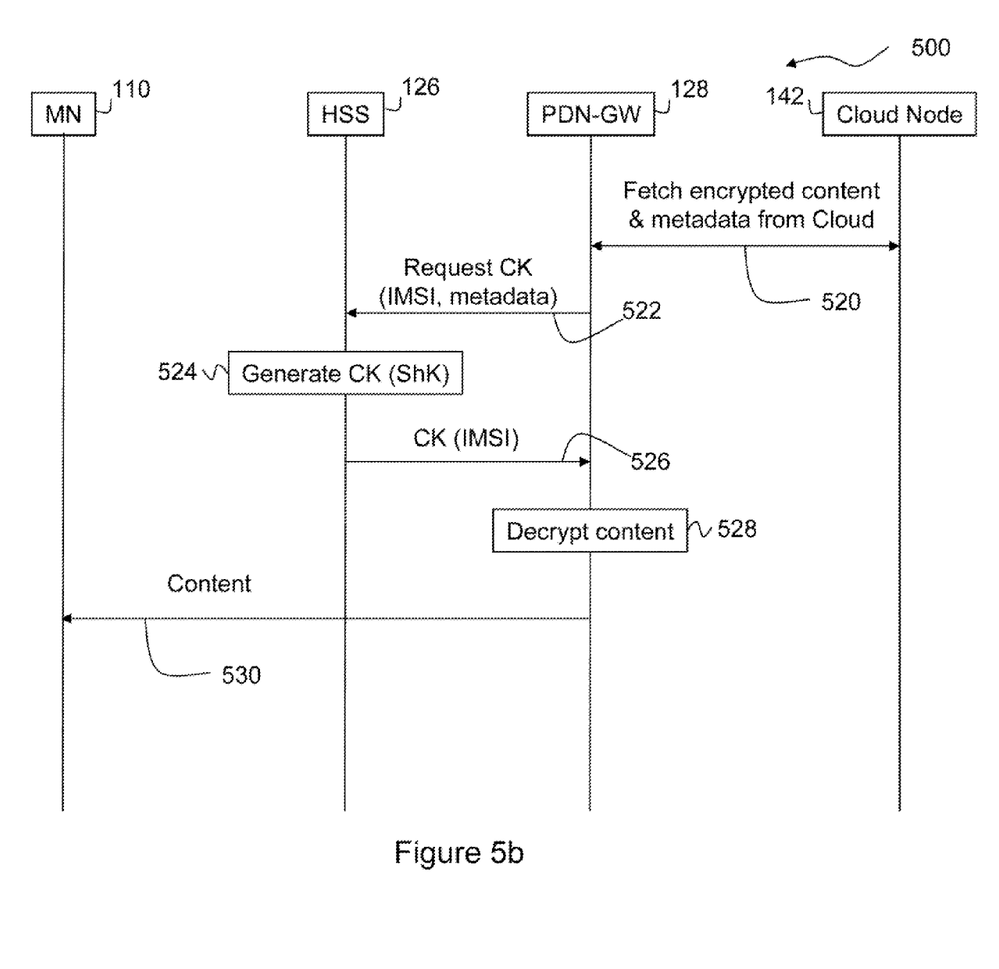

FIGS. 5a and 5b, collectively referred to as FIG. 5, show an exemplary sequence diagram of another embodiment of a method of the present invention, centered at a gateway node. A sequence 500 takes places between the various elements previously introduced in the description of FIG. 1. The sequence starts at step 502 when the MN 110 has a content that it intends to store remotely, in a node of the cloud. The MN 110 sends the content, along with an optional metadata, to the PDN-GW 128 at step 504. In some embodiments, metadata is not received from the MNA 110 but rather generated by the PDN-GW 128. In yet some embodiments, especially when the MN 110 is connected to its home network 124 via an untrusted visited network 122, the content may be encrypted by use of a session key, also called transport key. In some embodiments, this session key may also be provided by standard features of the USIM. Encryption based on the session key is applied to the content at the MN 110 and the content is decrypted using the session key at the PDN-GW 128 or at another node of the mobile network. Use of the session key for transport encryption is well-known in the art and is not described further herein. At step 506, the PDN-GW 128 sends towards the HSS 126 a request for obtaining a CK for the content of the MN 110. The request may further comprise the metadata, which may be stored in the HSS 126 in order to later identify the CK associated therewith. Alternatively or in addition to the request for the CK, the PDN-GW 128 may request an IK for protecting the integrity of the content for the MN 110. The request identifies the MN 110 by use of a suitable pointer understood by the PDN-GW 128 and by the HSS 126 as designating this particular MN 110, for example by use of its IMSI. The HSS 126 generates the CK (or IK, or both) based on the ShK of the MN 110 and based on a RAND (not shown). The CK is sent to the PDN-GW 128 at step 510. Because the PDN-GW 128 may support connections for many mobile nodes, the CK is sent at step 510 along with the IMSI of the MN 110. At step 512, the PDN-GW 128 encrypts the content by use of the CK. In the same step 512, the PDN-GW 128 may alternatively or additionally protect the content by use of IK. The content is transferred in encrypted form to the cloud node 142, at step 514. The metadata, which identifies the CK, may also be also attached to the content. The specific cloud node 142 may be determined from an IP address provided by the MN 110 when it sent the content, at step 504. The cloud node 142 stores the encrypted content at step 516. The PDN-GW 518 may discard the CK at step 518, thereby freeing up some memory and improving security against an eventual malicious party attempting to obtain the CK.

The content and the optional metadata are fetched again from the cloud node 142 into the PDN-GW 128 at step 520, generally when a request (not shown) has been received from the MN 110. Step 520 and the following steps may take place at the same or at a distinct PDN-GW 128, other than the one having executed the previous steps. This may occur for example when the mobile network 120 uses a plurality of PDN-GWs for redundancy purposes or for load balancing purposes. The PDN-GW 128 sends again a request to the HSS 126 for the CK (or IK or both). This request includes, if available, the metadata associated with the encrypted content. The HSS 126 regenerates the CK at step 524 (although the HSS 126 may also have preserved the CK in memory). If more than one CK is stored in or regenerated in the HSS 126, the relevant CK is determined by use of the metadata. The CK is sent to the PDN-GW at step 526. The PDN-GW 128 decrypts the content at step 528, and may alternatively or additionally verify the integrity of the content by use of the IK. The PDN-GW 128 then forwards the content to the MN 110 at step 530. As in the case of step 504, the content may be encrypted by use of a session key or transport key between the PDN-GW 128 and the MN 110, in conventional fashion.

An exemplary construction of a mobile node will now be described by reference to FIG. 6, which shows an exemplary construction of a mobile node according to an aspect of the present invention. A MN 600 comprises an interface 610 and a controller 620. The controller 620 may further comprise a subscriber identity module (SIM) 622. The MN 600 may further comprise a trusted platform module (TPM) 630 and a software stack. The software stack comprises an operating system (OS) 640, a virtual machine support software (VMware) 642, sometimes also called "hypervisor", and a plurality of virtual machines (VM) 644, 646 and 648. The controller 620 controls the interface 610 and many other components of the MN 600. The controller 620 may be operable to execute processes related to the present invention in addition to numerous other processes of the MN 600. The SIM 622 may be a 3 GPP-defined SIM, and may further comprise a USIM defined for $3^{rd}$ and $4^{th}$ generation 3 GPP mobile nodes. The interface 610 may be implemented as one single device or as distinct devices for receiving and sending signaling, messages and data. The MN 600 may be connected toward a plurality of networks; means for connecting the MN 600 toward other network elements may vary as, for example, connection toward one network might be using a $3^{rd}$ or $4^{th}$ generation cellular access network while connection toward another network might be using a WLAN connection or a Bluetooth™ connection. In some embodiments, the MN 600 may be capable of having a wired connection, for example by placing the MN 600 in a docking station. Some embodiments of the MN 600 may support wired connections only.

In operation, the interface 610 of the MN 600 communicates with an authentication server and with a remote node, the remote node possibly being part of a cloud computing network. Communication with the remote node may take place through a mobile network and specifically through a gateway of the mobile network. Upon determining that the MN 600 has a content to be sent to a remote node, the controller 620 sends towards the authentication server a request for a first challenge, the request optionally comprising metadata for associating the content with a key. The first challenge is received at the controller 620 (through the interface 610) from the authentication server. This first challenge comprises a random value. The controller 610 generates a content key (and/or an integrity key) based on the random value, and then encrypts the content by use of the content key. The controller 620 then transfers the encrypted content towards the remote node attaching the metadata to the content, if available.

Thereafter, the controller 620 discards the content key and optionally discards the random value. At a later point in time, generally upon request by a user of the MN 600, but possibly at other times such as a predetermined time, the controller 620 fetches the content from the remote node. It then sends towards the authentication server a request to generate a second challenge, the request comprising the metadata, if available. The second challenge is received from the authentication server at the controller 620. Because the random value may have been discarded by the controller 620, this second challenge may comprise the same random value that had been part of the first challenge. The controller 620 regenerates the same content key (and/or the same integrity key) based on the random value, and decrypts the fetched content by use of the regenerated content key.

In some embodiments, the SIM 622 stores a secret key shared with the authentication server. In those embodiments, it is the SIM 622 component of the controller 620 that generates and regenerates the content key based on the random value, on the shared secret key and possibly on other parameters.

In some embodiments comprising the SIM 622, the first challenge further comprises a first authentication token. The controller 620 calculates a first sequence number based on the first authentication token. The first sequence number is stored in the SIM. The second challenge also comprises a second authentication token. The controller 620 calculates a second sequence number based on the second authentication token. If the second sequence number is greater than the stored sequence number, regeneration of the content key and decryption of the content, by the controller 620, are allowed. This prevents the MN 600 from receiving and acting upon an illegitimate challenge from a malicious node pretending to be the authentication server. As long as the second sequence number is greater than the first sequence number, the controller 620 overwrites in the SIM 622 the first sequence number with the second sequence number.

In yet some embodiments, the TPM 630 validates the software stack of the MN 600, which comprises the OS 640 and the VMware 642, a plurality of virtual machines VM1 644, VM2 646 and VM3 648 being supported by this software stack. The random value received from the authentication server is encrypted by a public key of the TPM 630. Only the TPM 630 can decrypt the random value, thereby preventing content key generation or any further processing of the challenge if one or more of the VMs do not comply with a security policy. This may be a policy of the authentication server, of the user, or of the cloud itself. A policy may, for example, prevent obtaining at the MN 600 a new connection in a secure cloud network for the mobile node if one or more of the VMs already have a connection outside of the secure network. If allowed by the software stack, the TPM 630 uses its private key to decrypt the random value.

Figure 6:
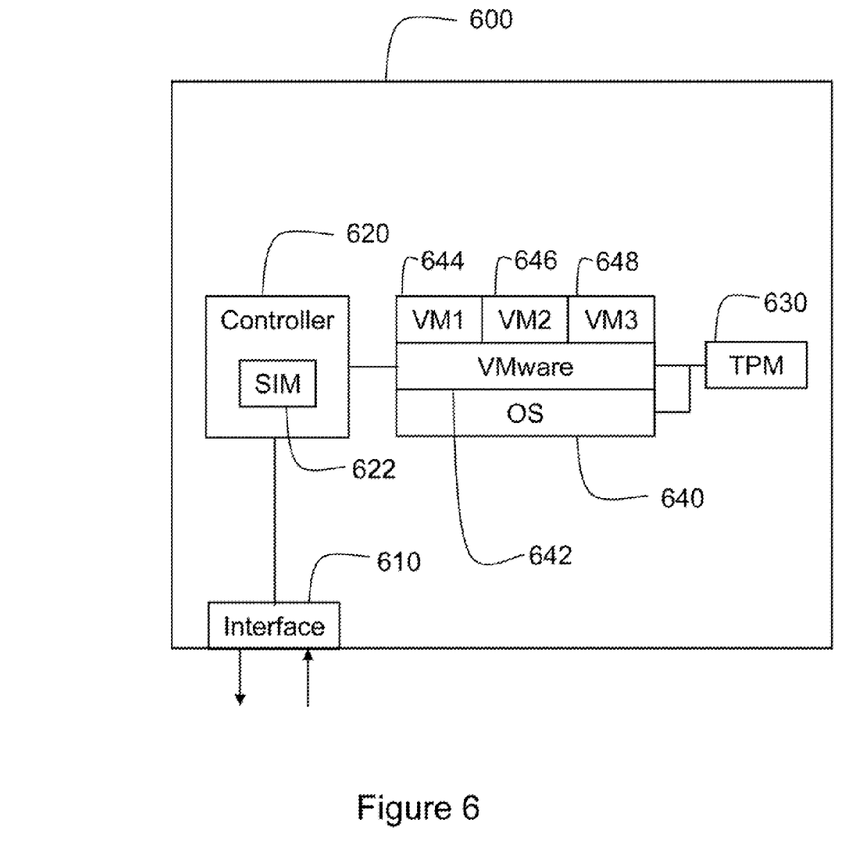
FIG. 6 shows an exemplary construction of a mobile node according to an aspect of the present invention.

In addition to the features described in relation to FIG. 6, the MN 600 may be capable of performing the features of the various embodiments of the MN 110 presented in FIGS. 1 to 5.

An exemplary construction of a gateway node will now be described by reference to FIG. 7, which shows an exemplary construction of a gateway node according to an aspect of the present invention. A gateway 700 comprises an interface 710 and a controller 720. The controller 720 controls the interface 710 and many other components of the gateway 700. The controller 720 may be operable to execute processes related to the present invention in addition to numerous other processes of the gateway 700. The gateway 700 may be connected toward a plurality of nodes of a mobile network and to a plurality of external networks such as cloud computing networks; means for connecting the gateway 700 toward other network elements may vary as, for example, connection toward an authentication server might be on an Ethernet link while connection toward cloud computing network might be on an asynchronous transfer mode (ATM) link. Therefore the interface 710 may comprise a plurality of devices for connecting on a plurality of links of different types. Only one generic interface 710 is illustrated for ease of presentation of the present invention. The gateway 700 may further act as a router or a server and may thus comprise many more components, as is well-known in the art.

In operation, the interface 710 of the gateway 700 communicates with an authentication server, with a mobile node and with a remote node, the remote node possibly being part of a cloud computing network. The controller 720 receives a content from a mobile node, the content possibly being associated with metadata. The controller 720 sends, through the interface 710, a request to generate a content key towards the authentication server, the request optionally comprising the metadata. The controller 720 receives the content key (and/or an integrity key) from the authentication server and uses the content key to encrypt the content. The controller 720 then transfers the encrypted content, and the optional metadata, towards the remote node. At a later point in time, for example upon request from the mobile node, the controller 720 fetches the content and the optional metadata from the remote node. The controller 720 then sends towards the authentication serve a request to regenerate the same content key, the request optionally comprising the metadata. Responsive thereto, the controller 720 receives the regenerated content key (and/or the same integrity key) from the authentication server. The controller 720 can now decrypt the fetched content by use of the regenerated content key.

Figure 7:
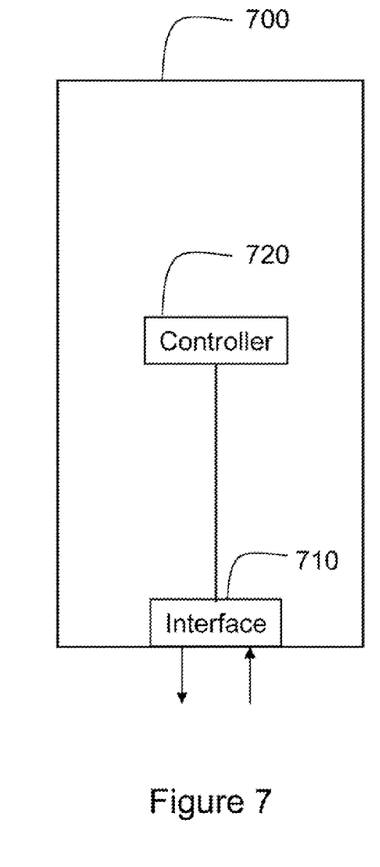
FIG. 7 shows an exemplary construction of a gateway node according to an aspect of the present invention.

In addition to the features described in relation to FIG. 7, the gateway 700 may be capable of performing the features of the various embodiments of the PDN-GW 128 presented in FIGS. 1 to 5.

Although several aspects of the preferred embodiment of the methods, of the mobile node and of the gateway node of the present invention have been illustrated in the accompanying Drawings and described in the foregoing Detailed Description, it will be understood that the invention is not limited to the embodiments disclosed, but is capable of numerous rearrangements, modifications and substitutions without departing from the teachings of the invention as set forth and defined by the following claims.

The invention claimed is:

1. A method of securely storing a content at a remote node received from a gateway node, the method comprising the steps of:
   receiving the content, at the gateway node, from a mobile node, said content being associated with metadata;
   sending, from the gateway node towards an authentication server, a request to generate a content key, the request comprising an identity associated said mobile node and said metadata;
   receiving the content key, at the gateway node, the content key being generated by the authentication server based on a random value and a secret key shared between the authentication server and the mobile node;
   encrypting at the gateway node the content by use of the content key;
   transferring the encrypted content and said metadata from the gateway node towards the remote node;

sending, from the gateway node towards the authentication server, a request to regenerate the same content key including said mobile node identity, said request including said metadata;

receiving, at the gateway node, the regenerated content key from the authentication server; and decrypting, at the gateway node, the fetched encrypted content by use of the regenerated content key.

2. The method of claim 1, wherein the remote node is a part of a cloud network.

3. The method of claim 2, wherein the gateway node provides access towards the cloud network to mobile nodes.

4. The method of claim 1, wherein the authentication server is a home subscriber server (HSS).

5. The method of claim 1, further comprising the step of:
discarding the content key from the gateway node following the step of transferring the encrypted content towards the remote node.

6. The method of claim 1, further comprising the step of:
forwarding the content from the gateway node towards the mobile node following the step of decrypting the fetched encrypted content.

7. A method of securely storing a content at a remote node received from a mobile node, the method comprising the steps of:

sending, from the mobile node towards an authentication server, a request for a first challenge, said request including with metadata generated by the mobile node;

receiving at the mobile node the first challenge from the authentication server, the first challenge comprising a random value and a first authentication token;

generating at the mobile node a content key based on the random value;

encrypting at the mobile node the content by use of the content key;

transferring the encrypted content and said metadata from the mobile node towards the remote node;

discarding the content key from the mobile node;

fetching at the mobile node the encrypted content from the remote node;

sending, from the mobile node towards the authentication server, a request and said metadata to generate a second challenge;

receiving, at the mobile node, the second challenge comprising the random value and a second authentication token from the authentication server;

calculating a second sequence number based on the second authentication token;

If the second sequence number is greater than the first sequence number, then regenerating, at the mobile node, the same content key based on the random value; and decrypting, at the mobile node, the fetched encrypted content by use of the regenerated content key.

8. The method of claim 7, wherein:
the step of discarding the content key from the mobile node further comprises discarding the random value from the mobile node.

9. The method of claim 8, wherein the mobile node associates a plurality of distinct metadata with distinct content keys for storing the same or distinct contents in a plurality of remote nodes.

10. The method of claim 7, wherein the remote node is a part of a cloud network; and
the mobile node obtains access to the cloud network through a gateway node.

11. The method of claim 7, wherein the authentication server is a home subscriber server (HSS).

12. The method of claim 11, wherein generating and regenerating the content key at the mobile node are further based on a secret key shared between the HSS and the mobile node.

13. The method of claim 7, wherein the mobile node regenerates a key by means of a subscriber identity module (SIM or USIM) for storing a secret key shared with the authentication server, the subscriber identity module further generating and regenerating the content key based on the random value and on the shared secret key.

14. The method of claim 13, wherein the first challenge further comprises a first authentication token;

the controller calculates a first sequence number based on the first authentication token;

the subscriber identity module stores the first sequence number;

the second challenge further comprises a second authentication token;

the controller calculates a second sequence number based on the second authentication token;

regenerating and decrypting at the controller are conditional to the second sequence number being greater than the first sequence number; and if the second sequence number is greater than the first sequence number, the controller overwrites in the subscriber identity module the first sequence number with the second sequence number.

15. A gateway node for communicating securely a content to a remote node, said content being securely stored in said remote node, said gateway node comprising:

a memory for storing instructions which are executed by a processor;

an interface configured to communicate with a mobile node, an authentication server and said remote node; and a controller for controlling the interface, wherein said controller is configured to receive the content and associated metadata from a mobile node via said interface, said controller sending towards the authentication server a request to generate a content key, the request comprising an identity of the mobile node and said metadata, such that when the content key generated by the authentication server based on a random value and a secret key shared between the authentication server and the mobile node is received, the controller will encrypt the content by use of the content key, transfer the encrypted content and said metadata towards the remote node, fetch the encrypted content from the remote node, send towards the authentication server a request to regenerate the same content key and said metadata, receive the regenerated content key from the authentication server and decrypt the fetched encrypted content by use of the regenerated content key.

16. A gateway node as defined in claim 15, wherein the gateway node provides access towards a cloud network to mobile nodes.

17. A gateway node as defined in claim 15, wherein the authentication server is a home subscriber server (HSS).

18. A gateway node as defined in claim 15, wherein the controller further discards the content key from the gateway after transferring the encrypted content towards the remote node.

19. A gateway node as defined in claim 15, wherein the controller further forwards the content from the gateway node towards the mobile node after decrypting the fetched encrypted content.

20. A mobile node for communicating securely a content to a remote node, said content being securely stored in said remote node, said mobile node comprising:
- an interface configured to communicate with a mobile node, an authentication server, and said remote node;
- a controller for controlling the interface, wherein said controller is configured to communicate with the authentication server to send and receive a request for a first challenge,
- said first challenge comprising a random value and a first authentication token,
- said controller then generating a content key based on the random value and a first sequence number based on the first authentication token, such that said controller can encrypt the content by use of the content key,
- transfer the encrypted content towards the remote node,
- discard the content key and then fetch the encrypted content from the remote node,
- the controller then sending towards the authentication server, a request to generate a second challenge and further receive the second challenge from the authentication server,
- the second challenge comprising the random value and a second authentication token,
- the controller then calculating a second sequence number based on the second authentication token,
- then if the second sequence number is greater than the first sequence number,
- the controller regenerates the same content key based on the random value, and
- decrypts the fetched encrypted content by use of the regenerated content key; and
- the controller comprises a subscriber identity module (SIM or USIM) for storing a secret key shared with the authentication server, the subscriber identity module further generating and regenerating the content key based on the random value and on the shared secret key.

21. The mobile node of claim 20, wherein:
the controller is further configured to discard the random value when it discards the content key.

22. The mobile node of claim 20, wherein:
the first challenge further comprises a first authentication token;
the controller calculates a first sequence number based on the first authentication token;
the subscriber identity module stores the first sequence number;
the second challenge further comprises a second authentication token;
the controller calculates a second sequence number based on the second authentication token;
regenerating and decrypting at the controller are conditional to the second sequence number being greater than the first sequence number; and
if the second sequence number is greater than the first sequence number, the controller overwrites in the subscriber identity module the first sequence number with the second sequence number.

23. The mobile node of claim 20, further comprising:
a trusted platform module (TPM):
wherein the random value received from the authentication server is encrypted by a public key of the TPM; and
wherein the TPM is for using its private key to decrypt the random value.

24. The mobile node of claim 23, further comprising:
a plurality of virtual machines (VM):
wherein the TPM refuses to decrypt the random value if one or more of the Ms do not comply with a security policy.

25. The mobile node of claim 24, wherein:
the TPM refuses to decrypt the random value if one or more of the VMs have a connection outside of a secure network for the mobile node.

* * * * *

UNITED STATES PATENT AND TRADEMARK OFFICE
CERTIFICATE OF CORRECTION

PATENT NO. : 8,452,957 B2  Page 1 of 1
APPLICATION NO. : 12/768034
DATED : May 28, 2013
INVENTOR(S) : Pourzandi et al.

It is certified that error appears in the above-identified patent and that said Letters Patent is hereby corrected as shown below:

In the Specification

In Column 7, Line 15, delete "value:" and insert -- value; --, therefor.

In Column 7, Line 38, delete "challenge" and insert -- challenge; --, therefor.

In the Claims

In Column 13, Line 50, in Claim 7, delete "If" and insert -- if --, therefor.

In Column 16, Line 25, in Claim 23, delete "(TPM):" and insert -- (TPM); --, therefor.

In Column 16, Line 31, in Claim 24, delete "(VM):" and insert -- (VMs); --, therefor.

In Column 16, Line 33, in Claim 24, delete "Ms" and insert -- VMs --, therefor.

Signed and Sealed this
Thirty-first Day of December, 2013

Margaret A. Focarino
*Commissioner for Patents of the United States Patent and Trademark Office*